United States Patent
Hite et al.

(10) Patent No.: US 11,294,950 B2
(45) Date of Patent: Apr. 5, 2022

(54) COOKING ENGAGEMENT SYSTEM EQUIPPED WITH A RECIPE APPLICATION FOR COMBINING THIRD PARTY RECIPE CONTENT

(71) Applicant: Haier US Appliance Solutions, Inc., Wilmington, DE (US)

(72) Inventors: Amy Elizabeth Pryor Hite, Louisville, KY (US); Chen Lu, Louisville, KY (US); Christopher George Bissig, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 64 days.

(21) Appl. No.: 16/251,252

(22) Filed: Jan. 18, 2019

(65) Prior Publication Data
US 2020/0233897 A1    Jul. 23, 2020

(51) Int. Cl.
| | |
|---|---|
| G06F 16/00 | (2019.01) |
| G06F 16/538 | (2019.01) |
| G06F 16/54 | (2019.01) |
| H05B 6/64 | (2006.01) |
| F24C 7/08 | (2006.01) |
| G06F 16/58 | (2019.01) |

(52) U.S. Cl.
CPC ............ *G06F 16/538* (2019.01); *F24C 7/086* (2013.01); *G06F 16/54* (2019.01); *G06F 16/5866* (2019.01); *H05B 6/6435* (2013.01)

(58) Field of Classification Search
CPC .... G06F 16/538; G06F 16/54; G06F 16/5866; H05B 6/6435; F24C 7/086
See application file for complete search history.

(56) References Cited

U.S. PATENT DOCUMENTS

| | | | | |
|---|---|---|---|---|
| 9,824,152 | B1* | 11/2017 | Feller | G06F 16/9535 |
| 9,928,448 | B1* | 3/2018 | Merler | H05K 999/99 |
| 2002/0026363 | A1* | 2/2002 | Dunaway, Jr. | G06Q 50/12 705/15 |
| 2002/0035536 | A1* | 3/2002 | Gellman | G06Q 40/00 705/37 |
| 2002/0121514 | A1* | 9/2002 | Ishikawa | H05B 6/6435 219/702 |

(Continued)

OTHER PUBLICATIONS

Whirlpool USA. "Whirlpool® Interactive Cooktop at CES 2014". <https://www.youtube.com/watch?v=6frHH5OtXU4>. 2014 (Year: 2014).*

(Continued)

*Primary Examiner* — Syed H Hasan
(74) *Attorney, Agent, or Firm* — Dority & Manning, P.A.

(57) ABSTRACT

A cooking engagement system and methods for providing recipe content to a user are provided. The system includes a cooking appliance and an interactive assembly positioned above the cooking appliance. The interactive assembly includes a display device that presents various content to a user, e.g., recipe content. In one example aspect, a user submits a recipe request. The recipe request is routed to one or more third party recipe content providers. A controller of the interactive assembly obtains recipe content from the recipe content providers and causes a display device of the interactive assembly to present the recipe content to the user.

18 Claims, 6 Drawing Sheets

(56) References Cited

U.S. PATENT DOCUMENTS

| | | | | |
|---|---|---|---|---|
| 2003/0030678 | A1* | 2/2003 | Rosenholtz | G06F 16/748 715/838 |
| 2004/0060932 | A1* | 4/2004 | Chun | H05B 6/6435 219/714 |
| 2006/0259371 | A1* | 11/2006 | Perrier | G06Q 20/203 705/27.1 |
| 2009/0134151 | A1* | 5/2009 | Bogatin | F24C 15/325 219/681 |
| 2009/0157752 | A1* | 6/2009 | Gonzalez | G06Q 30/06 |
| 2010/0182136 | A1* | 7/2010 | Pryor | F24C 7/082 340/425.5 |
| 2011/0055044 | A1* | 3/2011 | Wiedl | G06Q 30/0621 705/26.5 |
| 2011/0087987 | A1* | 4/2011 | Brown | F24C 7/082 715/771 |
| 2012/0056732 | A1* | 3/2012 | Bergmeier | G08C 17/00 340/12.54 |
| 2012/0136864 | A1 | 5/2012 | Ochtel | |
| 2013/0085345 | A1* | 4/2013 | Geisner | G02B 27/017 600/300 |
| 2013/0092032 | A1* | 4/2013 | Cafferty | F24C 7/08 99/325 |
| 2013/0171304 | A1* | 7/2013 | Huntley | G06Q 50/00 426/231 |
| 2013/0277353 | A1* | 10/2013 | Joseph | H05B 1/0263 219/209 |
| 2014/0089321 | A1* | 3/2014 | Engel | G06F 16/9535 707/748 |
| 2014/0181089 | A1* | 6/2014 | Desmond | G06F 16/5866 707/722 |
| 2014/0234496 | A1* | 8/2014 | Siegel | F23N 5/242 426/231 |
| 2015/0112759 | A1* | 4/2015 | Hong | G06Q 30/0631 705/7.29 |
| 2015/0195603 | A1* | 7/2015 | McDevitt | H04N 21/64322 725/109 |
| 2016/0092556 | A1* | 3/2016 | Cooper | G06F 16/50 707/748 |
| 2016/0179935 | A1* | 6/2016 | Bhattacharjya | G06F 40/247 707/713 |
| 2016/0364613 | A1* | 12/2016 | Kuroyama | H04N 5/23203 |
| 2017/0188741 | A1* | 7/2017 | Thomas | G03B 17/561 |
| 2018/0308143 | A1* | 10/2018 | Chan | G06Q 30/0643 |
| 2019/0053332 | A1* | 2/2019 | Cheng | A47J 36/321 |
| 2019/0171707 | A1* | 6/2019 | Rapaport | G06N 3/08 |
| 2019/0200797 | A1* | 7/2019 | Diao | A47J 27/00 |
| 2019/0213416 | A1* | 7/2019 | Cho | G06F 3/04845 |
| 2019/0279281 | A1* | 9/2019 | Kumar | G06Q 30/0631 |
| 2019/0385432 | A1* | 12/2019 | Allen, Sr. | H04Q 9/00 |
| 2020/0241847 | A1* | 7/2020 | Zhou | G06F 16/90335 |
| 2021/0043108 | A1* | 2/2021 | Baumback | G06F 40/237 |

OTHER PUBLICATIONS

Woodruff et al., A Comparison of the Use of Text Summaries, Plain Thumbnails, and Enhanced Thumbnails for Web Search Tasks. (Year: 2002).*

Wang, Linlin. Design and Implementation of a Database for Recipes. (Year: 2004).*

Full text of "Assorted Magazines—Nov. 18, 2017", Nov. 18, 2017, 205.

* cited by examiner

COOKING ENGAGEMENT SYSTEM EQUIPPED WITH A RECIPE APPLICATION FOR COMBINING THIRD PARTY RECIPE CONTENT

FIELD OF THE INVENTION

The subject matter of the present disclosure relates generally to systems for aiding cooking operations, and more particularly to systems equipped with a recipe application that combines or integrates third party recipe content into a single, searchable application.

BACKGROUND OF THE INVENTION

Consumers can access cooking recipes through many different types of media. For instance, a consumer can access recipes via cookbooks, recipe books, online websites and applications, etc. In some instances, to find a suitable recipe, a consumer must search multiple media types, and in some cases, multiple sources within the media types. For example, a consumer may need to search through multiple websites or applications to find a suitable recipe online. Further, there is no current application to combine recipes into a functional user-friendly platform that can be easily accessed to facilitate cooking operations.

Accordingly, systems and methods that address one or more of the challenges noted above would be useful.

BRIEF DESCRIPTION OF THE INVENTION

Aspects and advantages of the invention will be set forth in part in the following description, or may be obvious from the description, or may be learned through practice of the invention.

In one example aspect, a cooking engagement system is provided. The cooking engagement system includes a display device. Further, the cooking engagement system includes a controller communicatively coupled with the display device and one or more recipe content providers over a network, wherein a recipe application is executable by the controller and is configured to: receive, based on a user input, a recipe request; obtain, over the network, recipe content from the one or more recipe content providers based at least in part on the recipe request; and cause the display device to visually present the obtained recipe content.

In another example aspect, a method for providing recipe content to a user is provided. The method includes receiving, by a controller of an interactive assembly of a cooking engagement system, a recipe request based on a user input. Further, the method includes obtaining, by the controller of the interactive assembly and over a network, recipe content provided by one or more recipe content providers. The method also includes presenting, by a display device of the interactive assembly, the obtained recipe content.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
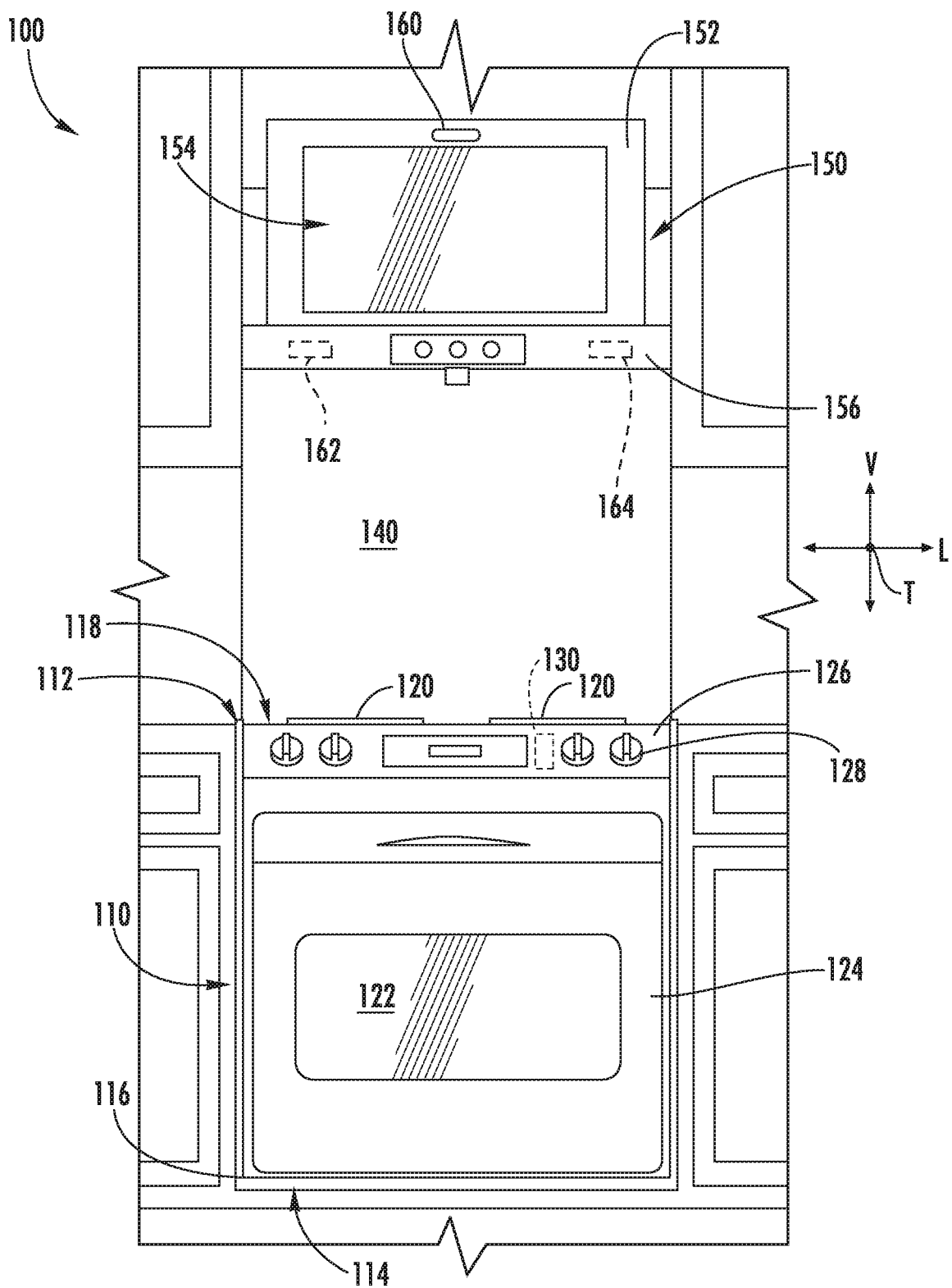
FIG. 1 provides a front perspective view of a cooking engagement system according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present disclosure. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

FIG. 1 provides a front perspective view of a cooking engagement system 100 according to an example embodiment of the present disclosure. Generally, cooking engagement system 100 includes a cooking appliance 110 and an interactive assembly 150 positioned above cooking appliance 110 as shown in FIG. 1. In some embodiments, however, interactive assembly 150 need not be positioned above cooking appliance 110. Cooking appliance 110 can be a range appliance having an oven and a cooktop appliance as shown in FIG. 1, for example. Cooking appliance 110 can be other suitable cooking appliances as well, such as e.g., a standalone cooktop appliance mounted to a kitchen counter. In some embodiments, cooking engagement system 100 can include multiple cooking appliances. For instance, cooking engagement system 100 can include two (2) or more range appliances.

As depicted, cooking appliance 110 defines a vertical direction V, a lateral direction L, and a transverse direction T (into and out of the page in FIG. 1). The vertical, lateral, and transverse directions V, L, T are mutually perpendicular and form an orthogonal direction system. For this embodiment, cooking appliance 110 extends between a top portion 112 and a bottom portion 114, e.g., along the vertical direction V; between a left side portion and a right side portion, e.g., along the lateral direction L; and between a front portion and a rear portion, e.g., along the traverse direction T.

Cooking appliance 110 includes a chassis or cabinet 116 and a cooktop surface 118 having one or more heating elements 120 for use in, for example, heating or cooking operations. In some embodiments, cooktop surface 118 is constructed with ceramic glass. In other embodiments, however, cooktop surface 118 may be formed of another suitable material, such as a metallic material (e.g., steel) or another suitable non-metallic material. Heating elements 120 may be various sizes and may employ any suitable method for heating or cooking an object, such as a cooking utensil (not shown), and its contents. In some embodiments, for example, heating element 120 uses a heat transfer method, such as electric coils or gas burners, to heat the cooking utensil. In other embodiments, however, heating element 120 uses an induction heating method to heat the cooking utensil directly. Accordingly, heating element 120 can be a gas burner element, resistive heat element, radiant heat element, induction element, or another suitable heating element.

In addition, as further shown in FIG. 1, cabinet 116 is insulated and defines a cooking chamber 122 selectively covered by a door 124. One or more chamber heating elements (e.g., top broiling elements or bottom baking elements; not shown) may be enclosed within cabinet 116 to heat cooking chamber 122. Chamber heating elements within cooking chamber 122 may be provided as any suitable element for cooking the contents of cooking chamber 122, such as an electric resistive heating element, a gas burner, a microwave element, a halogen element, etc. Thus, cooking appliance 110 may be referred to as an "oven range appliance" or simply "range appliance". Cooking appliance 110 is provided by way of example only, and the present subject matter may be used in the context of any suitable cooking appliance, as previously noted. Thus, the example embodiments illustrated in the figures are not intended to limit the present subject matter to any particular cooking chamber or heating element configuration, except as otherwise indicated.

As illustrated in FIG. 1, cooking appliance 110 includes a user interface panel 126, e.g., positioned at the forward portion of cooking appliance 110. Although shown at the front portion of cooking appliance 110, other suitable locations or structures (e.g., a backsplash) for supporting user interface panel 126 may be provided in alternative embodiments. For this embodiment, user interface panel 126 includes input components or controls 128, such as one or more of a variety of electrical, mechanical, or electro-mechanical input devices. Controls 128 may include, for example, rotary dials, knobs, push buttons, and touch pads. A controller 130 is communicatively coupled with user interface panel 126 and controls 128, e.g., by a suitable wired or wireless connection, for controlling cooking appliance 110. Thus, a user may select various operational features and modes via controls 128 and monitor progress of cooking appliance 110. In additional or alternative embodiments, user interface panel 126 includes a display component, such as a digital or analog display, communicatively coupled with controller 130. The display component is configured to provide operational feedback to a user. In certain embodiments, user interface panel 126 represents a general purpose I/O ("GPIO") device or functional block.

As noted above, controller 130 is communicatively coupled (i.e., in operative communication) with user interface panel 126 and controls 128. Controller 130 may also be communicatively coupled with various operational components of cooking appliance 110 as well, such as heating elements 120, heating elements positioned within cooking chamber 122, sensors, etc. Input/output ("I/O") signals may be routed between controller 130 and the various operational components of cooking appliance 110. Thus, controller 130 can selectively activate and operate these various components. Various components of cooking appliance 110 are communicatively coupled with controller 130 via one or more communication lines such as, for example, conductive signal lines, shared communication busses, or wireless communications bands.

In some embodiments, controller 130 includes one or more memory devices and one or more processors. The processors can be any combination of general or special purpose processors, CPUs, or the like that can execute programming instructions or control code associated with operation of cooking appliance 110. The memory devices (i.e., memory) may represent random access memory such as DRAM or read only memory such as ROM or FLASH. In some embodiments, the processor executes programming instructions stored in memory. The memory may be a separate component from the processor or may be included onboard within the processor. Alternatively, controller 130 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 130 includes a network interface such that controller 130 can connect to and communicate over one or more networks with one or more network nodes. Controller 130 can also include one or more transmitting, receiving, or transceiving components for transmitting/receiving communications with other devices communicatively coupled with cooking appliance 110. Additionally or alternatively, one or more transmitting, receiving, or transceiving components can be located off board controller 130. Generally, controller 130 can be positioned in any suitable location throughout cooking appliance 110. For example, controller 130 may be located proximate user interface panel 126 toward front portion of cooking appliance 110.

As further shown in FIG. 1, cooking engagement system 100 includes interactive assembly 150. Generally, interactive assembly 150 includes features for facilitating cooking operations and for serving as a control hub of a smart kitchen, or more broadly, as the control hub of a smart building or home. Interactive assembly 150 includes a display device 152 for visually presenting content to users, such as e.g., one or more recipes or guided cooking videos. Display device 152 can be any suitable type of mechanism for visually presenting an image (e.g., a digital image). For example, display device 152 may be a liquid crystal display (LCD), a plasma display panel (PDP), a cathode ray tube (CRT) display, etc. Display device 152 includes an image surface or screen 154 on which images are presented or displayed as an optically-viewable picture (e.g., static image or dynamic video) to a user. Optionally, a protective transparent panel (e.g., formed from a transparent glass, plastic, etc.) can be positioned across or over screen 154. For this embodiment, screen 154 of display device 152 is a touch-screen that provides an interface for users to interact with display device 152, or more broadly, interactive assembly 150. Thus, display device 152 is a touchscreen display device in this embodiment. In this way, a user can touch various digitally presented images to control various features of interactive assembly 150, cooking appliance 110, or other features or appliances. In alternative embodiments, display device 152 need not include a touchscreen. Rather, in such embodiments, interactive assembly 150 can include one or more input selectors 158 (FIG. 2) for interacting with interactive assembly 150. In addition, in some embodiments, display device 152 can include touchscreen 154 and input selectors 158.

For this embodiment, screen 154 of display device 152 is oriented orthogonal to cooktop surface 118 and generally faces, or is directed away from, cooktop surface 118. In particular, screen 154 is directed toward an area forward of cooking appliance 110. During use, a user standing in front of cooking appliance 110 may view the optically-viewable images (e.g., recipe, dynamic video stream, graphical user interface, etc.) displayed at screen 154. Optionally, the screen 154 can be positioned at an angle, e.g., with a downward or upward tilt, for ease of viewing.

Display device 152 is encased within a casing 156. Casing 156 can include various mounting features, e.g., for mounting interactive assembly 150 to a kitchen wall or vent. Casing 156 can be mounted to any suitable structure. For this embodiment, casing 156 is mounted such that interactive assembly 150 is spaced from cooktop surface 118 along the vertical direction V. An open region 140 may thus be defined along the vertical direction V between cooktop surface 118 of cooking appliance 110 and a bottom end of casing 116. Further, casing 156 can include cooling and ventilation features, e.g., for cooling the internal electronic components and for preventing condensation buildup on touchscreen 154.

Interactive assembly 150 can include other features that facilitate interaction with interactive assembly 150. For instance, for this embodiment, interactive assembly 150 includes a camera device 160 operable to capture images (e.g., images of recipe cards), a microphone 162 (e.g., for providing voice commands to interactive assembly 150), and a speaker 164 (e.g., for providing audio feedback or instructions from interactive assembly 150). Camera device 160, microphone 162, and/or speaker 164 can be mounted to casing 156, to display device 152, or some other suitable structure of interactive assembly 150. In some embodiments, camera device 160, microphone 162, and/or speaker 164 can be integral with display device 152. For instance, as shown in FIG. 1, camera device 160 is integral with display device 152. In some alternative embodiments, camera device 160 can be a downward facing camera mounted to casing 156 or some other suitable structure of interactive assembly 150 or the structure to which interactive assembly 150 is mounted.

Figure 2:
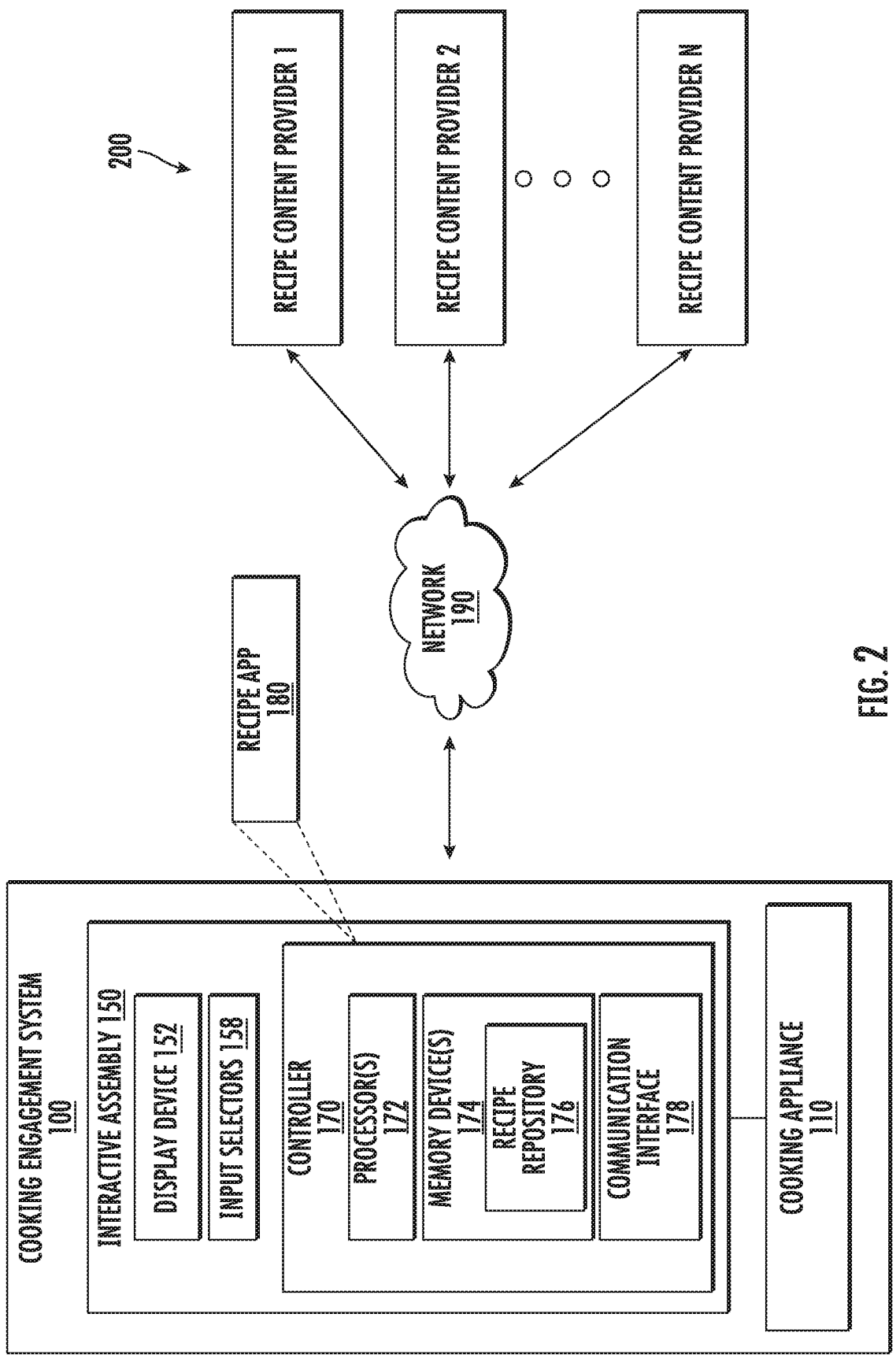
FIG. 2 provides a schematic view of the cooking engagement system of FIG. 1.

FIG. 2 provides a schematic view of cooking engagement system 100. As shown, interactive assembly 150 includes a controller 170. Controller 170 is communicatively coupled with various components of interactive assembly 150 and other components of cooking engagement systems 100, such as cooking appliance 110. In some embodiments, controller 170 includes one or more processor(s) 172 and one or more memory device(s) 174. The processor(s) 172 of controller 170 can be any suitable processing device, such as a microprocessor, microcontroller, integrated circuit, or other suitable processing device. The memory device(s) 174 of controller 170 can include any suitable computing system or media, including, but not limited to, non-transitory computer-readable media, RAM, ROM, hard drives, flash drives, or other memory devices. The memory device(s) 174 of controller 170 can store information and/or data accessible by processor(s) 172 of controller 170, including instructions that can be executed by processor(s) 172 of controller 170 in order to provide functionality to interactive assembly 150 or components communicatively coupled thereto. For instance, controller 170 can execute one or more software applications, e.g., a recipe application 180, or control logic for certain functionality operations, e.g., for obtaining recipe content from various sources and causing display device 152 to visually present the obtained recipe content to a user. Moreover, the memory device(s) 174 can include a recipe repository 176, e.g., for storing recipe content.

Controller 170 includes a communication interface 178 operable to communicatively couple or connect interactive assembly 150 with various networks, such as e.g., network 190, as well as other components of cooking engagement system 100, such as cooking appliance 110. Communication interface 178 can include suitable components for interfacing with one more networks or other devices. For example, communication interface 178 can include transmitters, receivers, ports, controllers, antennas, or other suitable components for interfacing with network 190 and/or other devices. Communication interface 178 can establish communication with a network in any suitable manner, e.g., via a wired or wireless communication link, and with any suitable protocol. Controller 170 can provide control functionality for communication interface 178.

Network 190 can be any suitable type of network, such as a local area network (e.g., intranet), wide area network (e.g., internet), low power wireless networks, e.g., Bluetooth Low Energy (BLE), or some combination thereof and can include any number of wired or wireless links. In general, communication over network 190 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

As further depicted in FIG. 2, one or more recipe content providers 200 are communicatively coupled with cooking engagement system 100 via network 190. Particularly, the one or more recipe content providers 200 are communicatively coupled with controller 170 of interactive assembly 150, e.g., via network 190. For example, as depicted in FIG. 2, a first Recipe Content Provider 1, a second Recipe Content Provider 2, and so on to the Nth Recipe Content Provider N are communicatively coupled with interactive assembly 150 via network 190. Any suitable number of recipe content providers 200 can be communicatively coupled with interactive assembly 150. In some embodiments, the one or more recipe content providers 200 are third party recipe content providers. That is, the recipe content providers 200 are separate entities from the operator or manager of recipe application 180 executable on controller 170 of interactive assembly 150. The recipe content providers 200 can include one or more computing or storage devices for storing recipe content. As will be explained more fully below, the recipe content stored on the one or more computing or storage devices of the recipe content providers 200 can be obtained by controller 170 of interactive assembly 150, compiled, and ultimately presented to a user via display device 152.

As noted above, controller 170 can execute one or more software applications. For instance, recipe application 180 or "Recipe App" is executable by controller 170. Generally, recipe application 180 provides users with a "one stop shop" for viewing, manipulating, and accessing recipe content. More specifically, upon a recipe request (e.g., a key word search) or some other trigger event, recipes stored on the interactive assembly 150 (e.g., within recipe repository 176 of memory device(s) 174) and/or gathered from third party recipe content providers 200 can be presented to a user in a single location, e.g., display device 152. The recipe content can be manipulated (i.e., searched, sorted, filtered, browsed, etc.) and presented by display device 152 as optically-viewable images at screen 154 of display device 152. As an example, display device 152 can present recipe information in the form of viewable text, images, videos, interactive virtual or graphical elements that allow a user to select or manipulate various recipes or content, some combination thereof, etc. As another example, display device 152 can present a captured image taken by camera device 160 (FIG. 1), a live (e.g., real-time) dynamic video stream received from a separate user or device, or a recorded recipe guide providing step-by-step video instructions for a cooking operation. A user may engage, select, or adjust the images presented at display device 152 through any suitable input, such as gesture controls detected through camera device 160 (FIG. 1), voice commands or controls detected through one or more microphones 162 (FIG. 1), associated touch panels (e.g., capacitance or resistance touch panel) or sensors overlaid across screen 154, etc.

Figure 3:
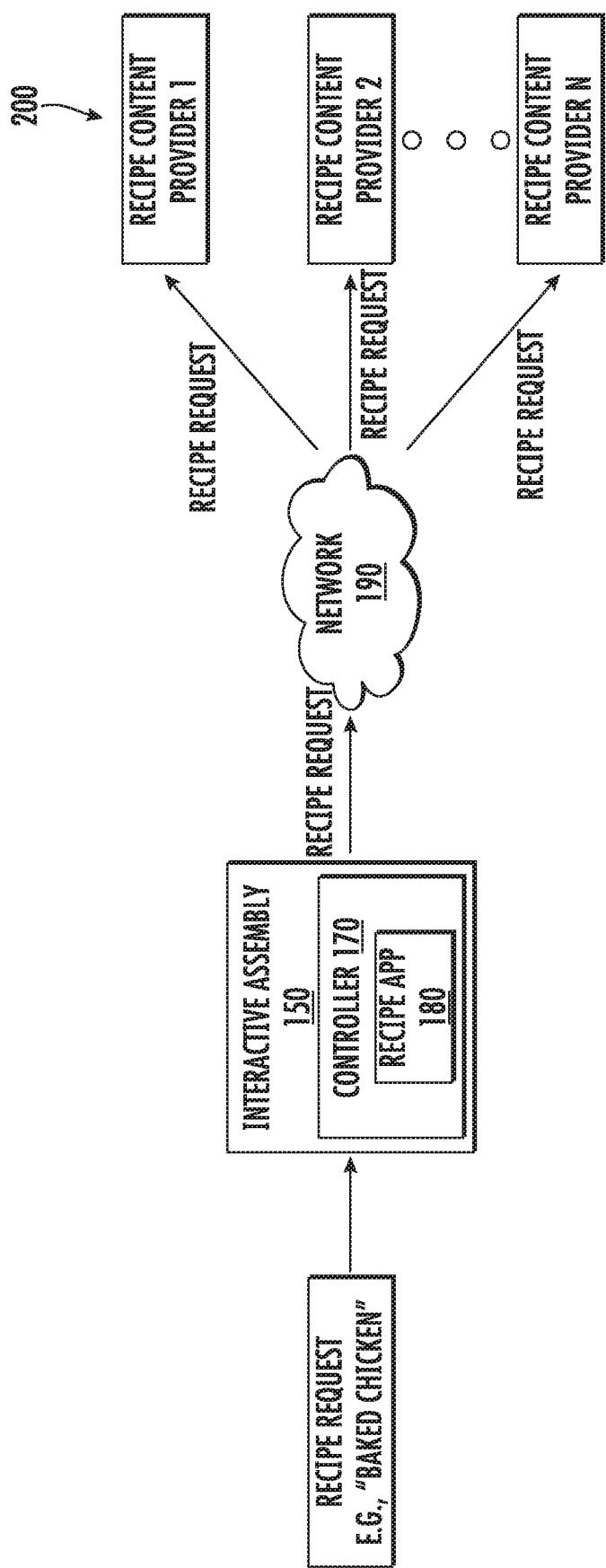
FIG. 3 provides a flow diagram of an example manner in which recipe content can be requested.

Recipe content can be provided to a user in the following example manner. First, a user can provide a user input to initiate a recipe request. As one example, with reference to FIG. 3, a user can perform a key word search using recipe application 180 to initiate a recipe request. For instance, a user can enter the term "Baked Chicken" into a search function. The user can type "Baked Chicken" into the search function using touchscreen 154 of display device 152 (e.g., via a touchscreen keyboard). Once the keyword is entered into the search function, one or more signals indicative of the recipe request can be routed to controller 170. As another example, with recipe application 180 open, a user can perform a voice command to initiate the recipe request. The user can command: "Search Baked Chicken Recipes" and microphone 162 can receive the voice command and route one or more signals indicative of the voice command to controller 170. Accordingly, no matter the method of initiating a recipe request, controller 170 receives, based on the user input, the recipe request. As depicted in FIG. 3, interactive assembly 150 receives the recipe request.

Once the recipe request is received by interactive assembly 150, or more particularly, controller 170 of interactive assembly 150, the recipe request is routed from interactive assembly 150 over network 190 to various recipe content providers 200. For instance, as shown in FIG. 3, the recipe request is routed to the first Recipe Content Provider 1, the second Recipe Content Provider 2, and so on to the Nth Recipe Content Provider N. The recipe content relating to or associated with the recipe request is pulled or extracted from each recipe content provider 200. For instance, continuing with the example above, each recipe relating to "Baked Chicken" can be extracted, pulled, or otherwise obtained from each recipe content provider 200.

Figure 4:
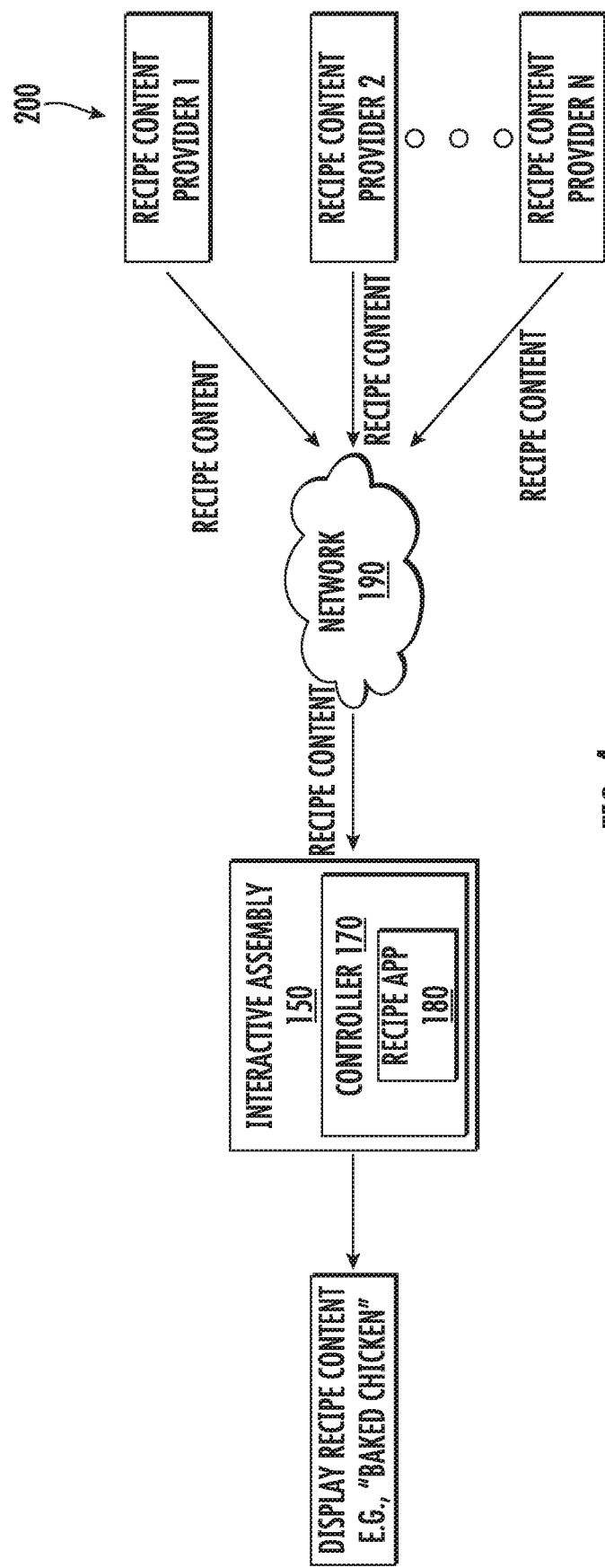
FIG. 4 provides a flow diagram of an example manner in which recipe content can be obtained.

After the recipe content is extracted or pulled from the recipe content providers 200, the recipe application 180 running on controller 170 of interactive assembly 150 obtains, over network 190, recipe content from the one or more recipe content providers 200 based at least in part on the recipe request. For example, as shown in FIG. 4, recipe application 180 obtains recipe content from the recipe content providers 200. Particularly, recipe content is obtained from the first Recipe Content Provider 1, the second Recipe Content Provider 2, and so on to the Nth Recipe Content Provider N. The recipe content can include, images, text, metadata, video, audio instructions, a title, classifying information, etc. Accordingly, recipe content relating to the user's recipe request obtained from third party recipe content providers 200 is combined into a single application, and as will be described below, the recipe content can be presented to the user.

In some embodiments, the obtained recipe content includes one or more guided recipes. The guided recipe can include step-by-step audio and/or video instructions. The guided recipe can also include instructions for automatically setting certain features of the cooking appliances 110 communicatively coupled with interactive assembly 150. For example, a guide recipe for "Baked Chicken" can include automatic instructions for oven of cooking appliance 110 to turn on to the correct temperature and may set a timer for cooking the baked chicken.

If a particular recipe content provider 200 does not have content relating to or associated with the recipe request, that particular recipe content provider 200 can provide a feedback message indicating that no content was found relating to or associated with the recipe request. Accordingly, recipe application 180 running on controller 170 can also obtain such feedback messages from each recipe content provider 200 that does not have content relating to or associated with the recipe request. In this way, controller 170 receives confirmation that the particular content provider 200 received the recipe request and does not in fact have any content relating to or associated with the recipe request. Results indicating that a particular content provider does not have content relating to the recipe request can be displayed via display device 152 to the user.

Once the recipe application 180 running on controller 170 obtains, over network 190, recipe content from the one or more recipe content providers 200 based at least in part on the recipe request, recipe application 180 compiles the obtained recipe content. For instance, in some embodiments, compiling the obtained recipe content includes extracting information from the obtained recipe content (e.g., from the metadata, key words, title, picture content, video content, etc.) and organizing the extracted information into a standard format such that it may be displayed in a uniform and consistent way to a user, e.g., via display device 152.

Figure 5:
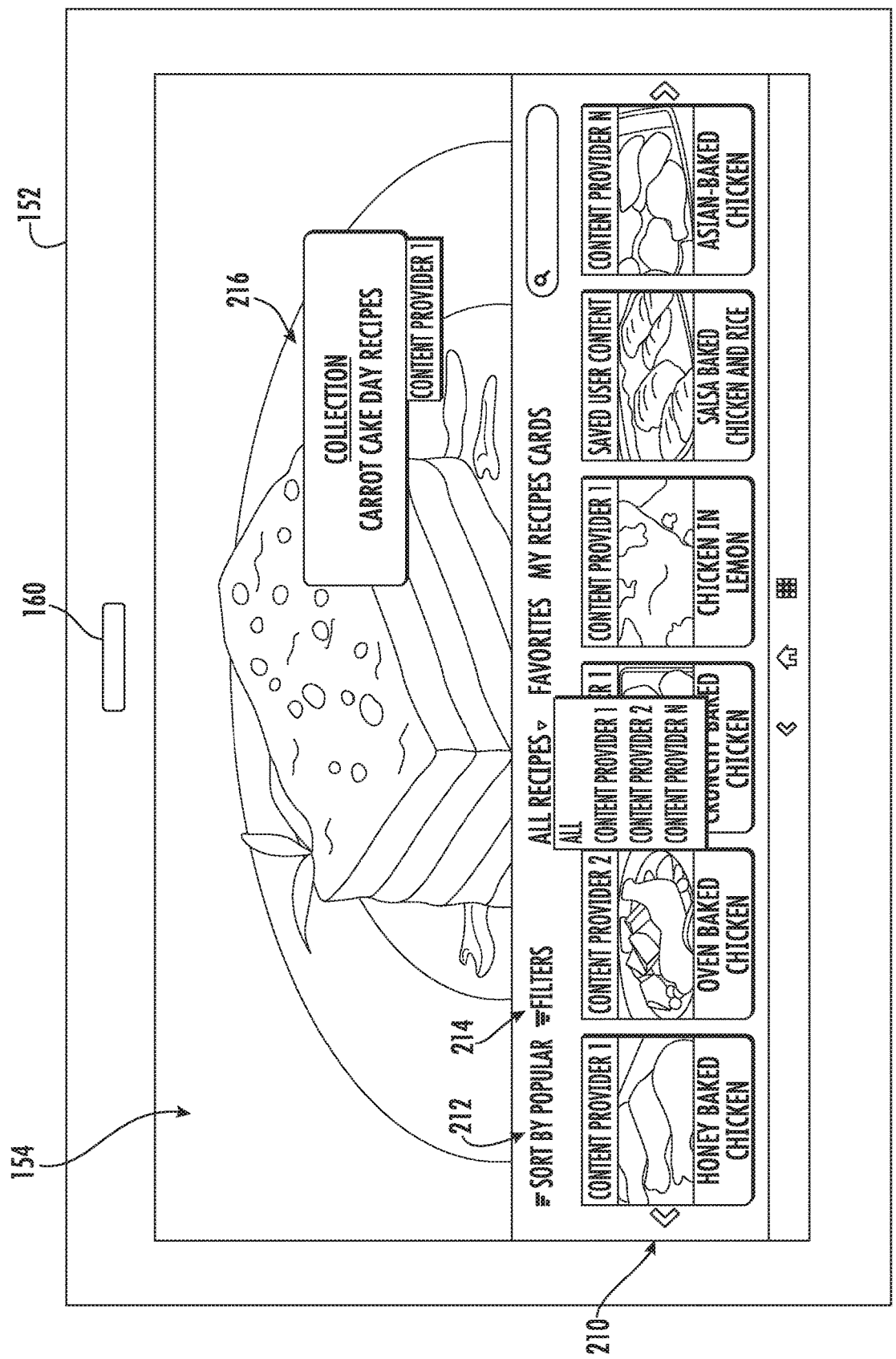
FIG. 5 provides a schematic, close up view of recipe content being displayed on a display device.

Next, after compiling the obtained recipe content, recipe application 180 executable on controller 170 causes display device 152 to visually present the compiled recipe content, e.g., to a user. By way of example, as shown in FIG. 5, recipe content obtained from the recipe content providers 200 is visually presented by display device 152. Particularly, recipe content obtained from first Recipe Content Provider 1, second Recipe Content Provider 2, and so on to the Nth Recipe Content Provider N is shown presented on screen 154 of display device 152. As depicted, various recipes relating to or associated with the recipe request are displayed by display device 152. For this example, as the recipe request was "Baked Chicken," various recipes relating to or associated with "Baked Chicken" are presented on display device 152. In this way, recipe content obtained from third party recipe content providers 200 can be presented to a user in a standard format in a single location, e.g., display device 152. Thus users need not search multiple media types and different websites, applications, etc. to obtain recipes for cooking operations.

Further, the displayed recipe content can be manipulated by a user. That is, the displayed recipe content can be searched, browsed, filtered, sorted, etc. For instance, in some embodiments, the displayed recipe content is browseable by a browse function of the recipe application 180 executable by controller 170. By way of example, as shown in FIG. 5, recipe application 180 includes a browse function 210. Recipe content can be browsed by browse function 210. For this embodiment, browse function 210 is a scroll function that enables a user to scroll the thumbnails to the left or right (e.g., via a touch input) by touching the left arrow or the right arrow shown on screen 154 in FIG. 5. Additionally or alternatively, as yet another example, browse function 210 can be a dropdown menu.

In some embodiments, the displayed recipe content is sortable by a sorting function of recipe application 180 executable by controller 170. By way of example, as shown in FIG. 5, recipe application 180 includes a sorting function 212. Sorting function 212 is operable to sort the displayed recipe content by at least one of: popular recipes, a recipe content provider, a food category, a dietary profile, a user profile, and a recipe ranking. For example, popular recipes can be indicative of recipe content that has been clicked on or selected most frequently in a predetermined time, e.g., within a one week period. Content can also be sorted by recipe content provider. In this way, a user can sort by his or her favorite content providers. Recipe content can also be sorted by food category, or more specifically by subcategory. For instance, a user can sort the search results by subcategories, such as "Sugar Free", "Gluten Free", "Heart Healthy", etc. Recipe content can also be sorted according to a dietary profile of a user. For instance, a particular user may have certain dietary restrictions preferences, e.g., a peanut allergy, or may wish to cook a meal under or over a certain number of calories per serving. Moreover, recipe content can be sorted by or in accordance with a user profile. For example, a user may prefer certain content providers, meals certain ingredients, etc. Further, in some embodiments, recipe content can be sorted by a recipe ranking. For instance, users may rank certain recipes that they prepare and such rankings may be recorded. Then, users can select higher ranking recipes that other users have verified. In other embodiments, the recipe content can be sorted by other suitable criteria.

In yet other embodiments, the displayed recipe content is filterable by a filter function of recipe application 180 executable by controller 170. By way of example, as shown in FIG. 5, recipe application 180 includes a filter function 214. Filter function 214 is operable to filter the displayed recipe content by at least one of: a popular recipe, a recipe content provider, a food category, a dietary profile, a user profile, and a recipe ranking. When the recipe content is filtered, only the recipe content meeting or matching the filter criteria is displayed.

In some embodiments, in addition to the recipe content obtained from third party recipe content providers 200, recipe content stored in one of memory device(s) 174 of controller 170 can be obtained and presented to a user if the content relates to or is associated with the recipe request. The recipe content can be stored in recipe repository 176 of the one or more memory device(s) 174, for example. In some embodiments, camera device 160 can be used to capture images of indicative of recipe content. For example, camera device 160 can capture an image of a recipe written down on an index card. The recipe application 180 executable by the controller 170 is then configured to receive, from camera device 160, one or more captured images indicative of recipe content. The captured images can be stored in recipe repository 176. Further, in some embodiments, recipe application 180 executable by controller 170 is further configured to classify the one or more captured images. For example, controller 170 can receive information, e.g., from a user, indicating the subject matter of the recipe. As another example, controller 170 can classify the recipe content by performing a text search of the recipe. For instance, if the title of the recipe card says: "Grandma's Baked Chicken," the recipe can be classified under a food category of "Chicken" and a subcategory of "Baked Chicken." As yet another example, controller 170 can include image classification software or logic. Accordingly, controller 170 can use a suitable imaging classification technique to identify the recipe content in the event the captured image contains an image of a food item. Any or all of these techniques can be used in conjunction with one another. Other techniques of classifying the recipe content are possible.

In some embodiments, when a user submits a recipe request, recipe application 180 executable on controller 170 is configured to determine whether the one or more classified captured images relate to or are associated with the recipe request. For instance, if the recipe request is "Baked Chicken" and one or more of the captured images relate to or are associated with "Baked Chicken", then controller 170 causes display device 152 to present the one or more captured images associated with the recipe request, e.g., on screen 154. The recipe content from the captured images can be displayed alongside the recipe content obtained from the recipe content providers 200 or can be displayed without this content. By way of example, as shown in FIG. 5, recipe content obtained from a captured image is presented on display device 152 as "Saved User Content." The Saver User Content displayed on screen 154 of display device 152 can be browseable, sortable, and filterable, e.g., in the manner described above.

In addition, in some embodiments, recipe application 180 executable by the controller 170 of interactive assembly 150 is further configured to provide at least one of a search function and a browse function for searching or browsing the one or more captured images, respectively. For instance, the search and/or browse functions can provide a means of searching or browsing recipe content stored or saved in recipe repository 176. By way of example, as shown in FIG. 5, a header labeled as "My Recipe Cards" located on a ribbon of the screen 154 provides a means for browsing or searching recipe content saved by a user via the captured image technique described above. By selecting the "My Recipe Cards" button, a drop down menu can appear or a new page can be presented to a user visually depicting the captured images, e.g., as thumbnails.

In some embodiments, recipe application 180 executable by controller 170 is further configured to receive, based on a user input, a save request relating to the recipe content obtained from the one or more recipe content providers 200. For instance, if a user finds recipe content obtained from the one or more recipe content providers 200 to be to his or her liking, a user can click on the displayed recipe content and select a "Save" or "Like" button to initiate a save request. Next, recipe application 180 executable by controller 170 is configured to store, in recipe repository 176 of one of the memory device(s) 174 of controller 170, the recipe content associated with the save request. In this way, the saved recipe content can be displayed with the results of future searches, browsing sessions, etc. As one example, with reference to FIG. 5, the saved recipe content can be searched or browsed by user selection of the header label "Favorites" located on the ribbon of screen 154.

As further depicted in FIG. 5, in some embodiments, recipe application 180 executable by controller 170 can present a featured recipe. Particularly, recipe application 180 can obtain, over network 190 and automatically upon a user opening recipe application 180, a featured recipe from the one or more recipe content providers 200. That is, when a user opens recipe application 180 on interactive assembly 150, recipe application 180 can obtain a featured recipe from one of the recipe content providers 200. The featured recipe can be a daily, weekly, monthly, etc. featured recipe. The featured recipe can be one manner in which content providers 200 can advertise or place their products in front of consumers. Once recipe application 180 obtains the featured recipe, recipe application 180 can cause display device 152 to present the featured recipe. For example, as shown in FIG. 5, a featured recipe 216 is displayed by display device 152. In this example, featured recipe 216 is titled as "Carrot Cake Day Recipes" and an example piece of carrot cake is prominently displayed on screen 154 of display device 152.

In some embodiments, in obtaining, over network 190 and automatically upon the user opening recipe application 180, the featured recipe 216 from the one or more recipe content providers 200, recipe application 180 executable by controller 170 is configured to determine user preferred content based at least in part on past recipe requests. For example, when a user performs or initiates a recipe request, recipe application 180 can track the subject matter of the recipe request. For instance, if a user searches "Chocolate Cake" to initiate a recipe request, recipe application 180 can record "Chocolate Cake" as user preferred content. Once the user preferred content is determined by recipe application 180 running on controller 170, recipe application 180 is configured to select the featured recipe based at least in part on the determined user preferred content. For instance, in obtaining the featured recipe 216, recipe application 180 can route the user preferred content to the recipe content providers 200, e.g., to the first Recipe Content Provider 1, the second Recipe Content Provider 2, and so on to the Nth Recipe Content Provider N of FIG. 2. Featured recipes relating to or associated with the user preferred content is pulled or extracted from each or a select number of recipe content providers 200. After the recipe content is extracted or pulled from the recipe content providers 200, the recipe application 180 running on controller 170 of interactive assembly 150 obtains, over network 190, featured recipes from the one or more recipe content providers 200 based at least in part on the user preferred content. Recipe application 180 can then select one of the featured recipes and display the featured recipe 216 as shown in FIG. 5.

Figure 6:
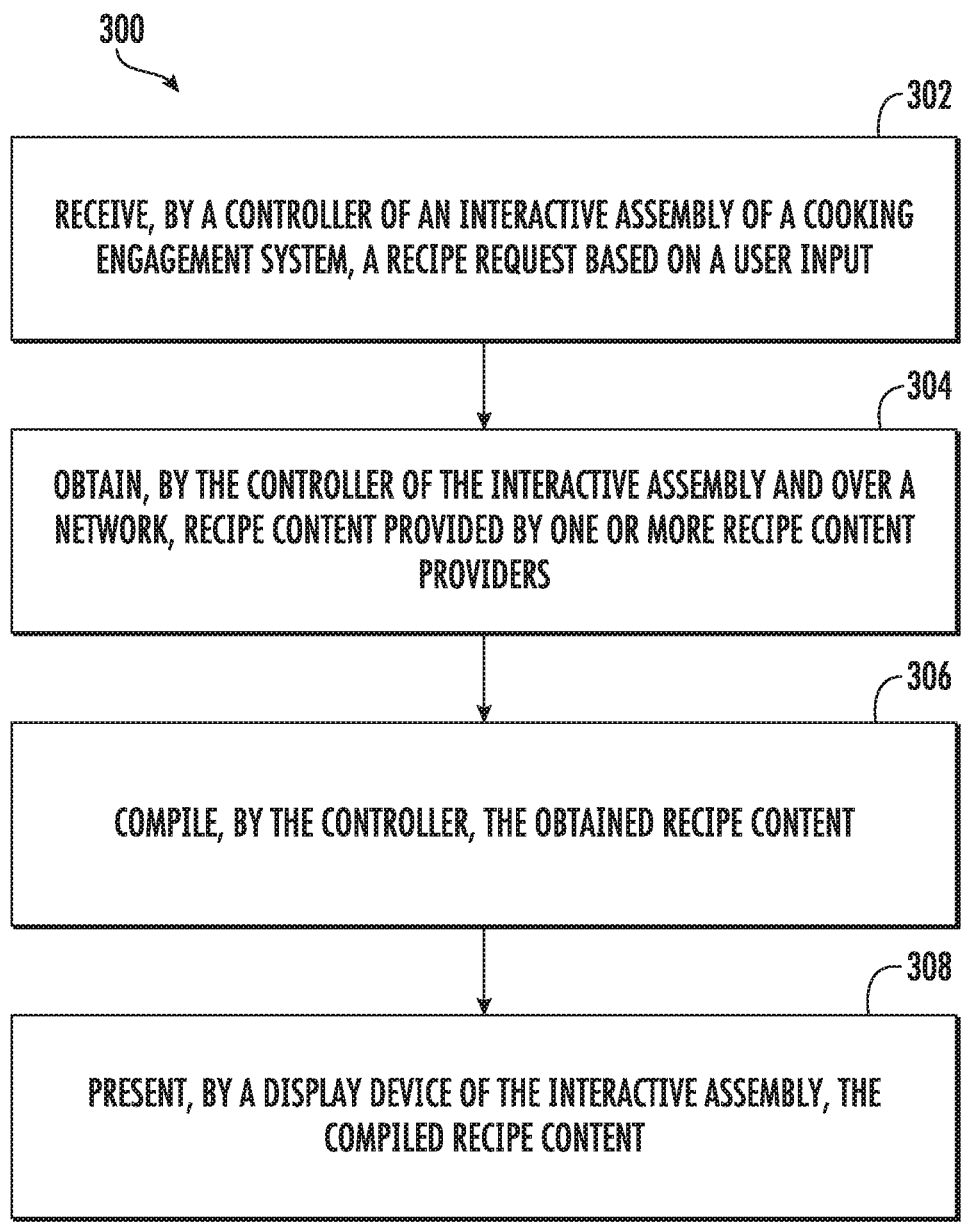
FIG. 6 provides a flow diagram of an example method for operating a cooking system according to an example embodiment of the present disclosure.

FIG. 6 provides a flow diagram of an example method (300) for providing recipe content to a user according to example embodiments of the present disclosure. The method (300) can be implemented by a cooking engagement system. For instance, the method (300) can be implemented by cooking engagement system 100 described herein. To provide context to example method (300), the reference numerals used in FIGS. 1 through 5 to describe the features of system 100 will be used below. It will be appreciated, however, that method (300) is not limited in scope to the system 100 and features thereof; rather, method (300) is applicable to other suitable cooking systems.

At (302), the method (300) includes receiving, by a controller of an interactive assembly of a cooking engagement system, a recipe request based on a user input. For instance, the controller can be controller 170 of interactive assembly 150 described herein. Interactive assembly 150 can receive the recipe request in any suitable manner. For example, a user may initiate a recipe request via voice command, by typing the recipe request into a touchscreen keyboard on screen 154 of display device 152, etc. Once the request is received by controller 170, controller 170 can route the recipe request to one or more recipe content providers 200, e.g., over network 190. In some implementations, a user can provide an advanced recipe request (i.e., an advanced search). For instance, a user can perform an advanced search and can search recipe content by key word, food category, one or more recipe content providers, by a pan or a utensil to be used (e.g., by wok, fajita pan, etc.), by cooking technique (e.g., by sous vide, baking technique, broil technique, etc.), as well as other criteria.

At (304), the method (300) includes obtaining, by the controller of the interactive assembly and over a network, recipe content provided by one or more recipe content providers. For instance, once the recipe request is routed to the one or more recipe content providers 200, recipe content relating to or associated with the recipe request is pulled, extracted, provided to, or otherwise received from each recipe content provider 200. If a particular recipe content provider 200 does not have content relating to or associated with the recipe request, that particular recipe content provider 200 can provide a feedback message indicating that no content was found relating to or associated with the recipe request. After the recipe content is extracted or pulled from the recipe content providers 200, the recipe application 180 running on controller 170 of interactive assembly 150 obtains, over network 190, recipe content from the one or more recipe content providers 200 based at least in part on the recipe request.

At (306), in some example implementations, the method (300) includes compiling, by the controller, the obtained recipe content. For instance, in some implementations, compiling the obtained recipe content includes extracting information from the obtained recipe content (e.g., from the metadata, key words, title, picture content, video content, etc.) and organizing the extracted information into a standard format such that it may be displayed in a uniform and consistent way to a user, e.g., via display device 152. For instance, as shown in FIG. 5, the recipe content is displayed to a user in standard format thumbnails with the content provider positioned at the top of the thumbnail, a title of the recipe content positioned at the bottom of the thumbnail, and an image or video of the food item that the recipe content pertains to is positioned between the content provider and title of the recipe content.

At (308), the method (300) includes presenting, by a display device of the interactive assembly, the compiled recipe content. For instance, after compiling the obtained recipe content, recipe application 180 executable on controller 170 can cause display device 152 to visually present the compiled recipe content, e.g., to a user. For example, as shown in FIG. 5, recipe content obtained from the recipe content providers 200 is visually presented by display device 152, e.g., in a standard format thumbnail. In this way, recipe content obtained from third party recipe content providers 200 can be presented to a user in a standard format in a single location, e.g., display device 152. Thus users need not search multiple media types and different websites, applications, etc. to obtain recipes for cooking operations.

In some implementations, the recipe content displayed via display device 152 can be manipulated using certain features of recipe application 180 executable on controller 170. For instance, in some implementations, the recipe content presented by display device 152 of interactive assembly 150 is searchable by a search function or browseable by a browsing function of recipe application 180 executable by controller 170. The recipe content can be searchable or browseable by at least one of: a key word, a food category, one or more recipe content providers, a pan or a utensil to be used during cooking, and a cooking technique.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking engagement system, comprising:
   a display device;
   a controller communicatively coupled with the display device and a plurality of recipe content providers over a network, wherein a recipe application is executable by the controller and is configured to:
      receive, based on a user input, a recipe request;
      obtain, over the network, recipe content from the plurality of recipe content providers based at least in part on the recipe request;
      compile the recipe content, the recipe content comprising the recipe content obtained from the plurality of recipe content providers and manually entered recipes; and
      cause the display device to visually present the compiled recipe content, wherein compiling the recipe content comprises extracting information from the recipe content and organizing the extracted information into a standard format comprising thumbnails, and wherein the compiled recipe content is sortable by a sorting function of the recipe application executable by the controller, wherein the sorting function is operable to sort the displayed recipe content by a recipe content provider, a food category, a dietary profile, a user profile, and a recipe ranking.

2. The cooking engagement system of claim 1, further comprising:
   a cooking appliance defining a vertical direction, wherein the display device is positioned above the cooking appliance along the vertical direction.

3. The cooking engagement system of claim 1, wherein the display device is a touchscreen display device.

4. The cooking engagement system of claim 1, further comprising:
   a camera device operable to capture images, and
   wherein the recipe application executable by the controller is further configured to:
      receive, from the camera device, one or more captured images indicative of recipe content.

5. The cooking engagement system of claim 4, wherein the recipe application executable by the controller is further configured to:
   classify the one or more captured images;
   determine whether the one or more classified captured images are associated with the recipe request; and
   cause the display device to present the one or more captured images associated with the recipe request.

6. The cooking engagement system of claim 4, wherein the recipe application executable by the controller is further configured to:
   provide at least one of a search function and a browse function for searching or browsing the one or more captured images, respectively.

7. The cooking engagement system of claim 1, wherein the recipe application executable by the controller is further configured to:
   receive, based on a user input, a save request relating to the recipe content obtained from the plurality of recipe content providers; and
   store, in a recipe repository of a memory device of the controller, the recipe content associated with the save request.

8. The cooking engagement system of claim 1, wherein the displayed recipe content is browseable by a browse function of the recipe application executable by the controller.

9. The cooking engagement system of claim 1, wherein the thumbnails display information comprising images and text.

10. The cooking engagement system of claim 1, wherein the displayed recipe content is filterable by a filter function of the recipe application executable by the controller, wherein the filter function is operable to filter the displayed recipe content by at least one of: a recipe content provider, a food category, a dietary profile, a user profile, and a recipe ranking.

11. The cooking engagement system of claim 1, wherein the recipe application executable by the controller is further configured to:
    obtain, over the network and automatically upon a user opening the recipe application, a featured recipe from the plurality of recipe content providers; and
    cause the display device to present the featured recipe.

12. The cooking engagement system of claim 11, wherein in obtaining, over the network and automatically upon the user opening the recipe application, the featured recipe from the plurality of recipe content providers, the recipe application executable by the controller is configured to:
    determine user preferred content based at least in part on past recipe requests; and
    select the featured recipe based at least in part on the determined user preferred content.

13. A method for providing recipe content to a user, the method comprising:
    receiving, by a controller of an interactive assembly of a cooking engagement system, a recipe request based on a user input;
    obtaining, by the controller of the interactive assembly and over a network, recipe content provided by a plurality of recipe content providers;
    compiling, by the controller, the recipe content, the recipe content comprising the recipe content obtained from the plurality of recipe content providers and manually entered recipes; and
    presenting, by a display device of the interactive assembly, the compiled recipe content, wherein compiling the recipe content comprises extracting information from the recipe content and organizing the extracted information into a standard format comprising thumbnails, and wherein the compiled recipe content is sortable by a sorting function executable by the controller, wherein the sorting function is operable to sort the displayed recipe content by a recipe content provider, a food category, a dietary profile, a user profile, and a recipe ranking.

14. The method of claim 13, wherein the recipe content presented by the display device of the interactive assembly is searchable by a search function of a recipe application executable by the controller, and wherein the recipe content is searchable by at least one of: a key word, a food category, the plurality of recipe content providers, a pan or a utensil to be used during cooking, and a cooking technique.

15. The method of claim 13, wherein the plurality of recipe content providers comprises third party recipe content providers.

16. The method of claim 13, wherein the obtained recipe content includes a guided recipe.

17. The method of claim 13, wherein the cooking engagement system has a cooking appliance defining a vertical direction, and wherein the interactive assembly is positioned above the cooking appliance along the vertical direction.

18. The method of claim 13, wherein the thumbnails display information comprising images and text.

* * * * *